United States Patent Office 3,024,869
Patented Mar. 13, 1962

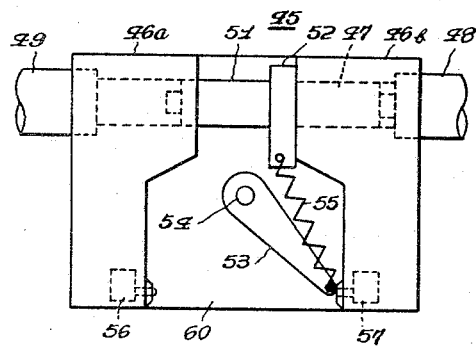

3,024,869
LUBRICANT SUPPLY DEVICE
Hayao Akamatsu, Kamakura-shi, and Tadashi Yoshikawa, Tsurumi-ku, Yokohama-shi, Japan, assignors to Shibaura Kyodo Kogyo Kabushiki Kaisha, Tsurumi-ku, Yokohama-shi, Japan, a joint-stock company of Japan
Filed Nov. 4, 1958, Ser. No. 771,825
Claims priority, application Japan Nov. 19, 1957
1 Claim. (Cl. 184—7)

This invention relates to a lubricant supply system which is actuated intermittently to supply a predetermined metered quantity of lubricant.

The conventional intermittent lubricant supply system which is now widely used in machine tools, rolling mills and the like comprises an oil pump, a pair of main pipes connected to said oil pump through a change-over valve, a plurality of distributing valves each including a piston therein and connected across said main pipes for feeding lubricant such as mineral oil and grease to moving parts requiring adequate oiling, and means responsive to the pressure in said main pipe for stopping said oil pump and actuating said change-over valve to interchange the connection between said main pipes and said oil pump. The oil pump is intermittently actuated by any suitable automatic means such as a clock timer. In the prior means responsive to lubricant pressure for actuating said change-over valve, however, contruction is relatively complicated and moreover it is difficult to ascertain whether the main pipes have been changed over or not, thus accompanying erroneous operation.

Accordingly, it is one object of this invention to provide a lubricant supply system including a change-over device which is simple in construction, easy to ascertain whether the lubricant supply pipe lines have been changed over or not, and is scarcely liable to erroneous operation.

Another object of this invention is to provide a lubricant supply system in which the change-over of the lubricant supply pipe lines can be indicated by a change-over member which is operated by a change-over piston.

Briefly stated, in accordance with this invention, there is provided a lubricant supply system comprising a pump, a pair of main pipes, a change-over valve for connecting one of said pipes with the outlet of said pump, a distributing valve including therein an operating piston and connected with said main pipes, and means for actuating said change-over valve to interchange the connection between said main pipes and the outlet of said pump, said means comprising a pair of spaced opposed cylinder sections with a portion thereof exposed, an actuating member mounted on said exposed portion, a rotating shaft which actuates said change-over valve, an arm mounted on said shaft, and an over-center spring between the free ends of said actuating member and arm. With such arrangement, due to the snap action of said arm, the change-over valve is positively operated and moreover the position of the arm indicates the state of the change-over valve. For facilitating such indication, the arm may be colored.

This invention will be more fully understood from the following explanation taken in connection with the accompanying drawing, in which the same members are indicated by the same reference numerals and in which:

FIG. 1 is a schematic representation of one embodiment of the lubricant supply system according to this invention, and FIG. 2 is an enlarged detailed view of the change over device in FIG. 1.

Referring now to the accompanying drawing, there is shown a lubricant supply system including an oil pump 1 having an inlet connected with an oil reservoir 3 through a pipe 2 and an outlet communicating with a change-over valve 5 through a pipe 4. For the sake of brevity, the term "oil" is used throughout the specification and the appended claim to represent any lubricant such as mineral oil, synthetic lubricant, grease and the like. The change-over valve 5 comprises a stationary casing 6 and a rotary valve member 7 therein which has a diametrical passage 8, and an arcuate groove 9 on its outer surface facing toward the inside of the casing. This groove is in communication with the pipe 4 through a port 10 provided through the casing 6. The casing 6 is further provided with a long arcuate slot 11 on its inner surface which is in communication with a drain tank (not shown) through an opening 12 in the casing and a pipe 13. The angular length of the groove 11 is designed in such a manner that it is always in communication with the passage 8 regardless the rotary motion of the rotary valve member as will be more fully explained later. The change-over valve is connected with a distributing valve 14 through a pair of main pipes 15 and 16. One end of the main pipe 15 is connected with the interior of the casing 6 through a port 17 and the other end is connected with an oblique passage 18 provided in an end wall 21 of the distributing valve. Similarly, one end of the other main pipe 16 is connected with the port 19 through the casing 6 and the other end is connected with another oblique passage 20 provided in said end wall 21. The port 10 is situated at a mid point between the ports 17 and 19 and the length of the arcuate groove 9 of the rotary valve member is just sufficient to connect the ports 17 and 10 or 10 and 19, as the case may be. In the condition shown in the drawing, the pipe 15 is connected with the pump through the groove 9 and the pipe 4, while the pipe 16 is in communication with the drain pipe 13 through the port 19, passage 18 and groove 11, but when the rotary valve member is rotated in a clockwise direction to the position shown by dotted lines, the pipe 16 will be connected with the pipe 4 through the groove 9 and the pipe 15 will be connected with the drain pipe 13 through the passage 8 and the groove 11.

The distributor valve 14 has two spaced end walls 21 and 24 and two intermediate partitions 22 and 23, between which are defined three cylinders 25, 26 and 27 of equal size. The opposite ends of each cylinder are closed by suitable threaded plugs. In each cylinder, tandem piston pairs 28 and 31, 29 and 32, and 30 and 33 are, respectively, disposed. By increasing number of said partitions, any desired number of cylinders may be provided. Said oblique passages 18 and 20 are provided in the end wall 21 so as to diverge in the opposite direction with their inner ends opened at the upper and lower ends, respectively, of the cylinder 25. Partitions 22, 23 and another end wall 24 are, respectively, provided with similar pair of oblique passages 34 and 43, 26 and 44, and 36 and 50. In the condition shown in the drawing, oil under pressure is introduced into the space of the cylinder 25 above the piston 28 through the change-over valve 5, main pipe 15 and the passage 18, whereby pistons 28 and 31 are moved downwardly to open the oblique passage 34 in the partition 22. Then the oil is introduced into the space above the piston 29 in the cylinder 26 to push the pistons 29 and 32 in the downward direction. When the piston 29 opens the passage 35, pressure oil will be introduced into the space above the piston 30 in the cylinder 27 to push the pistons 30 and 33 in the downward direction. When the passage 36 is opened by the downward movement of the piston, oil is supplied to the righthand side of the change-over piston 47 through the oblique passage 36 and a pipe 48. By the downward movement of pistons 28 and 31 in the cylinder 25, the oil beneath the piston 31 will be exhausted into a drain tank (not shown) through the passage 20, pipe 16, passage 8 and groove 11 in the change-over valve 5, and pipe 13. Pairs of oil outlet ports 37 and 38, 39 and 40, and 41 and 42 are, respectively, provided for respective cylinders at the positions near their central portions. Although not shown in the drawing, it should be understood that these outlet ports are connected with the moving parts which require adequate oiling. These outlet ports are provided in such relation that when piston pairs are in their lowermost positions, the upper outlets 37, 39 and 41 are, respectively, closed by the pistons 28, 29 and 30 while the lower outlet ports 38, 40 and 42 are opened, respectively, at the position between the pistons of each pair. On the contrary, when the piston pairs are in their uppermost positions, lower outlet ports are, respectively, closed by the pistons 31, 32 and 33 and the upper outlet ports are opened, respectively, at the position between the pistons of each pair. Therefore, by such successive downward movement of the piston pairs as described above, the oil contained in each cylinder will be supplied to the moving parts through the preceding cylinder. For example, the oil in the lower portion of the cylinder 26 will be forced out through the passage 43 in the cylinder 25 between the pistons 28 and 31 and the oil outlet port 38, and similarly the oil in the lower portion of the cylinder 27 through the passage 44 and outlet port 40.

Means 45 for actuating the change-over valve 5 comprises a cylinder 46 and a change-over piston 47 therein, the opposite ends of said cylinder being connected with the oblique passages 36 and 50 in the end wall 24, respectively, through pipes 48 and 49. As explained above, when the oil under pressure is supplied to the right-hand end of the cylinder 46, the oil contained in the cylinder at the left side of the piston 47 will be supplied to the moving parts through the pipe 49, passage 50, space in the cylinder 27 between the pistons 30 and 33, and the outlet port 42.

The detail of the means 45 for actuating the change-over valve will now be described with reference to FIG. 2. The cylinder 46 which is schematically shown in FIG. 1 is divided into two sections 46a and 46b which are secured on a base plate 60 in spaced opposed relation, and a common piston 47 co-operates with said sections, the intermediate portion 51 of said piston being exposed. An actuating member 52 is fixed to this exposed portion 51. An arm 53 is fixed to a rotating shaft 54 which is operatively connected with the rotary valve member 7 of the change-over valve 5 and the free ends of the lever 52 and arm 53 are interconnected by an over-center spring 55. A pair of switches 56 and 57 are mounted on the inner sides of the cylinder sections 46a and 46b to be acted by the free end of the arm 53 for controlling the energizing circuit of an electric motor (not shown) of the oil pump 1. As stated above, if a pressure oil is supplied to the cylinder section 46b through the pipe 48, the piston 47 will move to the left together with its lever 52. When the over-center spring 55 passes through and beyond the dead center position, it will rotate, with snap action, the arm 53 in the clockwise direction to engage with the switch 56 for deenergizing the pump driving motor. By this movement, the shaft 54 will rotate the rotary valve member 7 to the position shown by the dotted lines to stop the first oiling cycle. In addition, the arm 53 also functions to indicate the position of the piston 47, that is, the operating condition of the oil supply device. In order to make distinction of the arm 53 easier, it is advantageous to paint it with a distinctive color.

Next time, when the pump driving motor is started by such a suitable device as a clock timer, pressure oil will now be introduced into the lower portion of the cylinder 25 through the pipe 4, groove 9, pipe 16 and passage 20, whereby pistons 28 and 31 are moved upward to close the oil outlet port 38 and open the oil outlet port 37. Simultaneously therewith, the oblique passage 43 is opened to introduce the oil into the space beneath the piston 32 in the cylinder 26 to close the oil outlet port 40 and open the oblique passage 44 and the oil outlet port 39. Then, the oil above the piston 29 is forced out through the passage 34 and the port 37. In this way, successive piston pairs are operated to their upper positions in a predetermined sequence to send out oil of a predetermined quantity to moving parts, and when the last piston pair 30 and 33 are moved upward, the piston 47 will move to the right to snap the arm 53 to the position shown in FIG. 2. This will rotate the rotary valve member 7 in the reverse direction and also actuate the switch 57 to stop the second oiling cycle. It is also possible to utilize the switches 56 and 57 to operate a buzzer or an indicating lamp.

While in the foregoing explanation the present invention has been shown and described in connection with a particular embodiment thereof, it will be obvious to those skilled in the art that various modifications may be made without departing from the true spirit of this invention.

What we claim as new and desire to secure by Letters Patent of the United States is:

In a lubricant dispensing system for distributing a lubricant under pressure, in combination, a lubricant supply pump for providing a lubricant under pressure, a metering-distributor valve having a plurality of pressure-reciprocable floating pistons reciprocable sequentially and each reciprocable between opposite terminal positions to discharge sequentially metered quantities of lubricant from said metering-distributor valve, two conduits connected between the pump and said metering-distributor valve for providing lubricant under pressure to said valve for metering and distributing therefrom and connected to apply pressure to one of said reciprocable means to alternately move it between opposite terminal positions in dependence upon which conduit is under pressure from the pump, said metering-distributor valve having means providing passages for allowing lubricant flow into said metering-distributor valve to reciprocate said pairs of pistons in succession and all in a common direction at each half-cycle of reciprocable travel, a change-over valve connected to said conduits between the pump and the metering-distributor valve having a rotary valve member operable to two separate operative positions for alternately establishing connection between each of the conduits and the pump, means operably connected to said metering-distributor valve comprising a cylinder having a position control piston reciprocable therein responsive to lubricant flow under pressure causing a change of positions of another of said reciprocable pairs of pistons for alternately positioning the change-over rotary valve member in its two operative positions thereby to alternately provide the conduits with lubricant under pressure from the pump, means operably connecting the position control piston to said rotary valve member comprising a rotary shaft and means to translate the reciprocable movement of said position control piston to rotary motion of said shaft thereby to rotate said change-over rotary valve member to its two operative positions alternately, said metering-distributor valve having a plurality of pairs of ports, for each of said pairs of ports a respective one of said pairs of pistons to place them in communication individually and at separate times with said lubricant and meter a quantity of lubricant therethrough in dependence upon reciprocation of said pairs of pistons and upon the direction of travel of said pairs of pistons, said ports providing outlets for said metered quantities of lubricant to be delivered exteriorly of said metering-distributor valve, and said other pair of reciprocable pistons being disposed to reciprocate last in the sequence of reciprocable movement of said plurality of pairs of pistons.

References Cited in the file of this patent

UNITED STATES PATENTS

| | | |
|---|---|---|
| 1,977,233 | Hallerberg | Oct. 16, 1934 |
| 2,753,955 | Acker | July 10, 1956 |
| 2,937,716 | Schlosshauer | May 24, 1960 |

FOREIGN PATENTS

| | | |
|---|---|---|
| 475,745 | Great Britain | Nov. 25, 1937 |
| 784,323 | Great Britain | Oct. 9, 1957 |
| 787,478 | Great Britain | Dec. 11, 1957 |